(12) United States Patent
Neumann

(10) Patent No.: US 7,794,151 B2
(45) Date of Patent: Sep. 14, 2010

(54) FLUID DYNAMIC BEARING SYSTEM

(75) Inventor: Rudolf Neumann, Spaichingen (DE)

(73) Assignee: Minebea Co., Ltd, Nagano-ken (JP)

( * ) Notice: Subject to any disclaimer, the term of this patent is extended or adjusted under 35 U.S.C. 154(b) by 1074 days.

(21) Appl. No.: 11/403,639

(22) Filed: Apr. 13, 2006

(65) Prior Publication Data

US 2006/0238052 A1 Oct. 26, 2006

(30) Foreign Application Priority Data

Apr. 22, 2005 (DE) .................. 10 2005 018 836

(51) Int. Cl.
*F16C 32/06* (2006.01)
*B23K 26/00* (2006.01)
*B23P 15/26* (2006.01)

(52) U.S. Cl. .............. 384/100; 219/121.64; 29/898.054

(58) Field of Classification Search .................. 384/100, 384/107, 114, 121; 219/121.14, 121.64; 29/898.02, 898, 54, 898.07
See application file for complete search history.

(56) References Cited

U.S. PATENT DOCUMENTS

| 4,315,132 | A | * | 2/1982 | Saurin et al. | ........... | 219/121.64 |
| 4,574,176 | A | * | 3/1986 | Sharp | .................... | 219/121.64 |
| 5,786,559 | A | * | 7/1998 | Ottino et al. | ........... | 219/121.64 |
| 6,375,357 | B2 | * | 4/2002 | Miura et al. | ................. | 384/100 |
| 6,851,860 | B2 | | 2/2005 | Oelsch | | |
| 2003/0174637 | A1 | * | 9/2003 | Kull et al. | .................... | 369/269 |
| 2004/0218841 | A1 | * | 11/2004 | Aiello et al. | ................. | 384/107 |
| 2006/0144827 | A1 | * | 7/2006 | Papenfuss et al. | ...... | 219/121.64 |

FOREIGN PATENT DOCUMENTS

| DE | 3820848 | 6/1988 |
| DE | 4004544 | 2/1990 |
| DE | 10239650 | 8/2002 |
| JP | 2002130258 | 5/2002 |
| JP | 2005040853 | 2/2005 |

* cited by examiner

*Primary Examiner*—Thomas R Hannon
*Assistant Examiner*—Phillip A Johnson
(74) *Attorney, Agent, or Firm*—Cooper & Dunham LLP

(57) ABSTRACT

The invention relates to a fluid dynamic bearing system particularly for the purpose of rotatably supporting a spindle motor, having a first bearing part that comprises a bearing sleeve, and a second bearing part that comprises a shaft, the two bearing parts being spaced apart from one another by a bearing gap and being rotatable with respect to each other, wherein the bearing sleeve is closed at one end by a counter plate that is accommodated in an annular recess in the bearing sleeve and connected to the bearing sleeve by a welded joint. According to the invention, a bearing system is provided in which the counter plate has a reduced thickness ($D_2$) at its outer edge and is welded in the region of its reduced thickness ($D_2$) to the bearing sleeve. The reduced thickness of the counter plate at the region of its outer edge means that the vertical gap between the bearing sleeve and the counter plate is made very much shorter, or is done away with altogether, so that no unwanted air can remain in the gap.

14 Claims, 1 Drawing Sheet

FLUID DYNAMIC BEARING SYSTEM

BACKGROUND OF THE INVENTION

The invention relates to a fluid dynamic bearing system as used, for example, to rotatably support a spindle motor used to drive hard disk drives. The invention relates in particular to the construction of a joint between the bearing sleeve and counter plate of this kind of bearing system. A method of manufacturing such a bearing system is also described.

PRIOR ART

Spindle motors consist substantially of a stator, a rotor and at least one bearing system disposed between these two parts. Fluid dynamic sliding bearings are being increasingly employed as bearing systems. A fluid dynamic bearing system comprises a bearing sleeve and a shaft that is disposed in an axial bore in the bearing sleeve. The shaft rotates freely within the bearing sleeve, with the two parts together forming a radial bearing. The mutually interacting surfaces of the shaft and the bearing sleeve are spaced apart from one another by a thin, concentric bearing gap filled with a bearing fluid. The continuous capillary lubricant film and the self-centering mechanism of the fluid dynamic radial bearing ensure a stable, concentric rotation between the shaft and the bearing sleeve. Surface patterns formed on at least one bearing surface ensure that the required pressure is built up in the bearing fluid.

Displacement of the shaft along the rotational axis is prevented by a fluid dynamic axial bearing. In a fluid dynamic axial bearing, the bearing surfaces that mutually interact with one another, of which at least one is provided with a surface pattern, are each arranged in a plane perpendicular to the rotational axis and spaced axially apart from one another by a thin, preferably even, bearing gap filled with bearing fluid. Since a single fluid dynamic axial bearing can generally only absorb loads in one direction, it is usual for two fluid dynamic axial bearings working in opposition to each other to be employed. These bearings are preferably formed by the two end faces of a thrust plate disposed at one end of the shaft, one end face of the thrust plate being associated with a corresponding end face of the sleeve and the other end face of the thrust plate being associated with the inner end face of a counter plate. The counter plate thus forms a counter bearing to the thrust plate, hermetically seals the entire bearing system and prevents air from penetrating into the bearing gap filled with bearing fluid. In order to fill the bearing with bearing fluid, it is known to evacuate the bearing gap, which is completely sealed except for an aperture, to allow the bearing fluid to be subsequently "sucked" into the gap.

A fluid dynamic bearing system having a thrust plate disposed at one end as described above is revealed, for example, in U.S. Pat. No. 6,851,860 B2. The thrust plate is accommodated in a first recess in the bearing sleeve that is made to fit the dimensions of the thrust plate and is covered by a counter plate that is disposed in a second recess having a larger diameter. The larger diameter of the second recess means that a step is formed within the bearing sleeve, the step acting as an axial stop for the counter plate. The counter plate and the bearing sleeve are welded to each other at their abutting edges.

FIG. 5 shows an enlarged view of a typical embodiment of a welded joint between a bearing sleeve 10 and a counter plate 12 according to the prior art. Here, one can see a groove 13 in the bearing sleeve 10 that for production reasons is necessary to allow the counter plate to be inserted properly. The counter plate 12 is connected to the bearing sleeve 10 by means of a welded joint 14. As well as in the vertical and horizontal gaps 15, 16 that remain between the counter plate 12 and the bearing sleeve 10, air is particularly trapped in this groove 13, and, under certain circumstances, it cannot escape during the evacuation process since the shaft and the thrust plate (not illustrated) would have already been mounted. Air collecting in the groove 13 and the gaps 15, 16 in this way can result in the air escaping from the groove 13 and the gaps 15, 16 at a later stage after the bearing has been filled under vacuum, and in its displacing bearing fluid from the bearing. This can then lead to a lower oil level within the bearing and contamination in the region outside the bearing. This can result in a decrease in the useful life of the bearing or, in the worst case, to damage to the components outside the bearing.

SUBJECT MATTER OF THE INVENTION

It is the object of the invention to design a fluid dynamic bearing system, and in particular the connection between the bearing sleeve and the counter plate, in such a way that the possibility of air collecting in the bearing region is significantly reduced. A method of manufacturing a related bearing system is to be provided as well.

This object has been achieved according to the invention by a bearing system having the characteristics outlined in the independent claims.

Preferred embodiments and further beneficial characteristics of the invention are cited in the subordinate claims.

According to the invention, a bearing system is provided in which the counter plate has a reduced thickness at its outer edge and is welded in the region of this reduced thickness to the bearing sleeve. The reduced thickness of the counter plate at the region of its outer edge means that the vertical gap between the bearing sleeve and the counter plate is made very much shorter, or is done away with altogether, so that no unwanted air can remain in the gap.

According to a first preferred embodiment of the invention, the welded joint is provided at the abutting edges of the bearing sleeve and the counter plate, as is basically known. Here, it is preferable if a long-pulse laser welding process is used in which the workpieces to be welded together and the laser beam are moved with respect to one another during the welding process, and preferably only one single laser pulse per weld seam is used. At the same time, the power of the laser pulse should be at least 200 watts. The feed speed at the weld seam is preferably greater than or equal to 300 mm/s.

According to a second embodiment of the invention, an overlapping welding process is employed which is used in pulsed operation since higher outputs are required for this. Here, the two workpieces, namely the bearing sleeve and the counter plate, are not welded together at their edges as is normally the case, but rather the welding process proceeds right through the outer material of the counter plate, the counter plate being welded in the region of its reduced thickness to the end face of the bearing sleeve. To this effect, the counter plate is made thinner, particularly at the contact surface to the bearing sleeve. This embodiment of the invention has the advantage that both the volume of air in the groove as well as the volume of air in the gaps are separated from the bearing interior and no longer play a part. The use of overlapping welding makes it preferable if the thickness of the outer edge of the counter plate is less than 0.5 mm. However, a thickness of 0.2 to 0.3 mm for the counter plate is preferential.

BRIEF DESCRIPTION OF THE DRAWINGS

An embodiment of the invention is described in more detail below on the basis of the drawings. Further characteristics, advantages and possible applications of the invention can be derived from the drawings and their description. The drawings show.

DESCRIPTION OF PREFERRED EMBODIMENTS OF THE INVENTION

Figure 5:
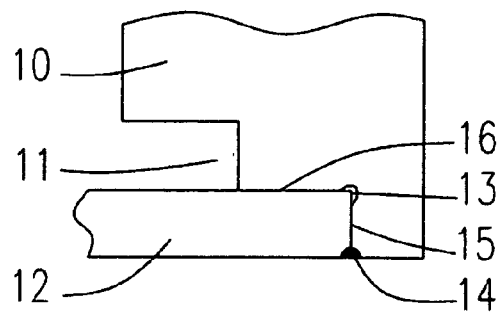
FIG. 5: a schematic sectional view of a bearing system according to the prior art.

FIG. 5 (prior art) has already been described in the introductory paragraphs of the description. Reference is made to this description.

FIGS. 1-4 illustrate possible embodiments of the invention with the same parts being indicated by the same reference numbers. A shaft 2 is rotatably supported in a bearing sleeve 1 and spaced apart by a bearing gap 5. A thrust plate (not illustrated), which is accommodated in a corresponding recess 3 in the bearing sleeve, is located on the shaft. The recess 3 is closed by a counter plate 4 that forms a counter bearing to the thrust plate. The counter plate 4 is likewise accommodated in a recess in the bearing sleeve. The counter plate has a thickness of $D_1$.

According to the invention, the region at the edge of the counter plate 4, which engages directly against the end face of the bearing sleeve 1, has a reduced thickness $D_2$ than the remaining region in the middle of the counter plate 4.

Figure 1:
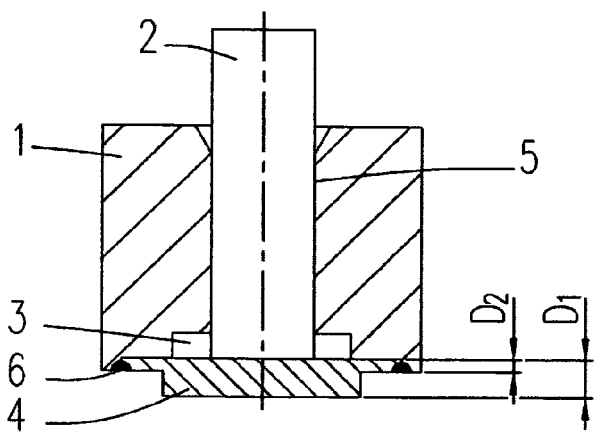
FIG. 1: a schematic sectional view of a first embodiment of the bearing system according to the invention.

In a first embodiment of the invention according to FIG. 1, the welded joint 6 is provided at the edges abutting each other of the bearing sleeve 1 and the counter plate 4, as is basically known. The workpieces to be welded 1 and 4 and the laser beam are moved with respect to each other during the welding process, preferably at a relative speed of 300 mm/s or more. The welding process is carried out with one single laser pulse per weld seam, the pulse duration being, for example, greater than or equal to 10 ms. Since the counter plate has a reduced thickness $D_2$ at its outer edge and the recess in the bearing sleeve also has a reduced height, the length of the vertical gap 15 (FIG. 5) is reduced or even disappears entirely. This means that no unwanted air can collect in the gap 15.

Figure 2:
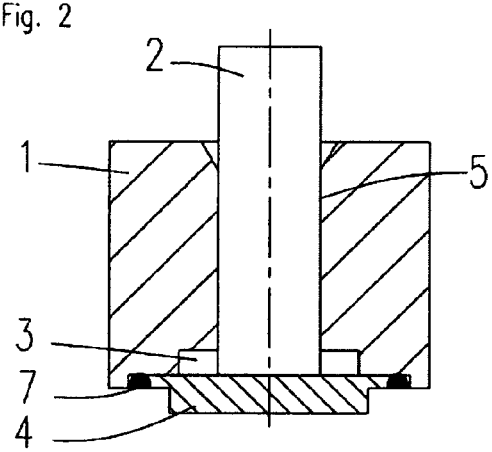
FIG. 2: a schematic sectional view of a second embodiment of the bearing system according to the invention.
Figure 3:
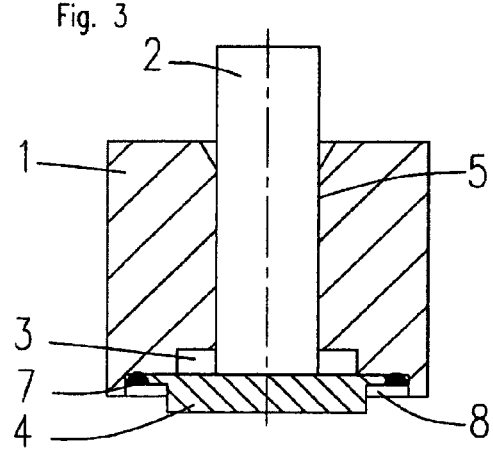
FIG. 3: a schematic sectional view of a modification of the second embodiment of the bearing system.
Figure 4:
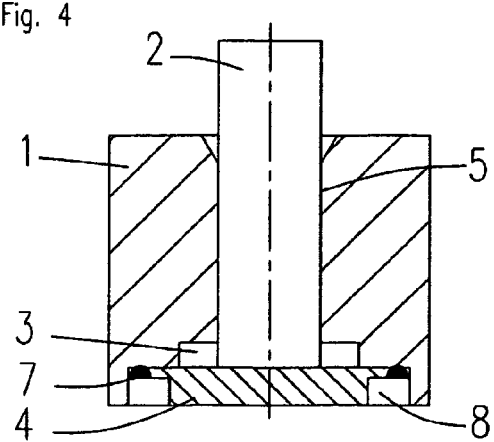
FIG. 4: a schematic sectional view of a further modification of the second embodiment of the bearing system.

In a second embodiment of the invention according to FIGS. 2 to 4, the counter plate 4 is connected to the bearing sleeve 1 by an overlapping welding process. Here, the welding process proceeds right through the outer material of the counter plate 4, the counter plate 4 being welded in the region of its reduced thickness $D_2$ to the end face of the bearing sleeve 1. The welded joint 7 extends at a certain distance to the thrust plate (recess 3).

In FIG. 2, the outer region of the counter plate ends in the same thickness $D_2$ as the related region of the recess in the bearing sleeve 1, whereas in FIGS. 3 and 4 the thickness (height) of the recess 8 is greater than the thickness of the counter plate 4, so that a free space remains in which the overlapping welding process can take place. In FIG. 4, the outer end region of the bearing sleeve 1 lies on the same plane as the lower middle region of the counter plate 4, located below the shaft 2 and the recess 3 for the thrust plate.

Compared to the regions abutting the bearing sleeve, this middle region of the counter plate 4 is given a thickness of $D_1$ and is approximately 1-2 mm thick. For embodiments of the bearing in which there is no axial bearing on the topside of the thrust plate, the counter plate 4 can be made thinner (approximately a few tenths of mm) so that the counter plate 4 can also show a uniform thickness $D_2$ in particular.

To facilitate overlapping welding, a laser pulse welding process or a point welding process is preferably used, wherein, for example, the following welding parameters could be applied:

Pulse power 0.4 kW<=P<=1 kilowatt
Pulse energy 2J/pulse<=W<=5 joules per pulse

Experiments have been carried out at a pulse power of P=0.6 kW with a pulse duration of t=5 ms so that the energy per pulse is W=3 J.

To check the oil tightness of the bearing, leakage tests using helium have been performed. The above welding process provides helium-tight and thus also oil-tight fluid dynamic bearings.

Alongside laser welding, it is also possible to use electron beam welding (e-beam welding).

Identification Reference List
1 Bearing sleeve
2 Shaft
3 Recess (for thrust plate)
4 Counter plate
5 Bearing gap
6 Welded joint
7 Welded joint
8 Recess
$D_1$ Thickness (in the middle)
$D_2$ Thickness (at the edge)
10 Bearing sleeve
11 Recess (for thrust plate)
12 Counter plate
13 Groove
14 Welded joint
15 Gap
16 Gap The invention claim is:

1. A fluid dynamic bearing system particularly for the purpose of rotatably supporting a spindle motor, having a first bearing part that comprises a bearing sleeve (1), and a second bearing part that comprises a shaft (2), the two bearing parts being spaced apart from one another by a bearing gap (5) and being rotatable with respect to each other, wherein the bearing sleeve (1) is closed at one end by a counter plate (4) that is accommodated in an annular recess in the bearing sleeve and connected to the bearing sleeve by a joint (6), characterized in that the counter plate (4) has a thickness ($D_1$) at its middle region and a reduced thickness ($D_2$) at its outer edge and that it is affixed in the region of its reduced thickness ($D_2$) to the bearing sleeve (1), wherein the reduced thickness ($D_2$) is at most one half of the thickness($D_1$), wherein the joint (6) comprises at least one laser or electron beam weld seam having a width, length, depth and continuity consistent with a single laser or electron beam pulse having a pulse power greater than or equal to 200 watts and a feed speed at the weld seam greater than or equal to 300 mm/s.

2. A fluid dynamic bearing system according to claim 1, characterized in that the reduced thickness of the counter plate (4) at its outer edge is less than 0.5 mm.

3. A fluid dynamic bearing system according to claim 1, characterized in that the joint (6) is provided at the abutting edges of the bearing sleeve (1) and the counter plate (4).

4. A fluid dynamic bearing system according to claim 1, characterized in that the joint is an overlapping welded joint (7) in which the counter plate (4) is welded in the region of its outer edge to the end face of the bearing sleeve (1), wherein the end face of the bearing sleeve is directly adjacent to the region of the counter plate's outer edge.

5. A fluid dynamic bearing system according to claim 1, characterized in that the reduced thickness ($D_2$) of the counter plate (4) at its outer edge is less than the clearance of the recess in the bearing sleeve (1), such that there is a free space within the annular recess in the bearing sleeve below the outer edge of the counter plate.

6. A fluid dynamic bearing system according to claim 1, characterized in that the joint is an electron beam welded joint.

7. A fluid dynamic bearing system according to claim 1, characterized in that the joint is a laser welded joint.

8. A fluid dynamic bearing system according to claim 7, characterized in that the laser welded joint is a laser pulse or a laser point welded joint.

9. A method for manufacturing a fluid dynamic bearing system particularly for the purpose of rotatably supporting a spindle motor using a first bearing part that comprises a bearing sleeve (1), and a second bearing part that comprises a shaft (2), the two bearing parts being mounted such that they are rotatable with respect to each other and that they are spaced apart from one another by a bearing gap (5), wherein the bearing sleeve (1) is closed at one end by a counter plate (4) that is accommodated in an annular recess in the bearing sleeve and connected to the bearing sleeve by means of a joint (6), characterized in that the counter plate (4) is provided with a thickness ($D_1$) at its middle region and a reduced thickness ($D_2$) at its outer edge and affixed in the region of its reduced thickness ($D_2$) to the bearing sleeve (1), wherein the reduced thickness ($D_2$) is at most one half of the thickness ($D_1$) characterized in that the bearing sleeve (1) and the counter plate (4) are welded to one another at their abutting edges, and further characterized in that one single laser pulse per weld seam is used in the welding, that the power of the laser pulse is greater than or equal to 200 watts and that the feed speed at the weld seam is greater than or equal to 300 mm/s.

10. A method according to claim 9, characterized in that the counter plate (4) is welded in the region of its outer edge to the end face of the bearing sleeve (1) by means of an overlapping welded joint (7), wherein the end face of the bearing sleeve is directly adjacent to the region of the counter plate's outer edge.

11. A method according to claim 9, characterized in that a pulse power between 0.4 kW and 1.0 kilowatt and a pulse energy of 2 joules per pulse to 5 joules per pulse is used for the welding process.

12. A method for manufacturing a fluid dynamic bearing system particularly for the purpose of rotatably supporting a spindle motor using a first bearing part that comprises a bearing sleeve (1), and a second bearing part that comprises a shaft (2), the two bearing parts being mounted such that they are rotatable with respect to each other and that they are spaced apart from one another by a bearing gap (5), wherein the bearing sleeve (1) is closed at one end by a counter plate (4) that is accommodated in an annular recess in the bearing sleeve and connected to the bearing sleeve by means of a joint (6), characterized in that the counter plate (4) is provided with a thickness ($D_1$) at its middle region and a reduced thickness ($D_2$) at its outer edge and affixed in the region of its reduced thickness ($D_2$) to the bearing sleeve (1), wherein the reduced thickness ($D_2$) is at most one half of the thickness($D_1$), characterized in that the bearing sleeve (1) and the counter plate (4) are welded to one another at their abutting edges, and further characterized in that one single electron beam pulse per weld seam is used in the welding, that the power of the electron beam pulse is greater than or equal to 200 watts and that the feed speed at the weld seam is greater than or equal to 300 mm/s.

13. A method according to claim 12, characterized in that a pulse power between 0.4 kW and 1.0 kilowatt and a pulse energy of 2 joules per pulse to 5 joules per pulse is used for the welding process.

14. A method according to claim 12, characterized in that the counter plate (4) is welded in the region of its outer edge to the end face of the bearing sleeve (1) by means of an overlapping welded joint (7), wherein the end face of the bearing sleeve is directly adjacent to the region of the counter plate's outer edge.

* * * * *